United States Patent [19]

Martin

[11] Patent Number: 4,732,329

[45] Date of Patent: Mar. 22, 1988

[54] IRRIGATION DRIPPER

[76] Inventor: Thomas A. Martin, P.O. Box 359, Bothas Hill, 3600, Natal, South Africa

[21] Appl. No.: 929,051

[22] Filed: Nov. 10, 1986

[30] Foreign Application Priority Data

Jan. 24, 1986 [ZA] South Africa .................. 85/5587

[51] Int. Cl.⁴ .............................................. B05B 15/00
[52] U.S. Cl. .................................. 239/542; 239/271; 239/547
[58] Field of Search ............... 239/542, 547, 271, 272

[56] References Cited

U.S. PATENT DOCUMENTS

| | | | |
|---|---|---|---|
| 1,520,048 | 12/1924 | Baird | 239/547 |
| 3,767,121 | 10/1973 | Campbell | 239/272 |
| 3,833,176 | 9/1974 | Caldwell | 239/542 |
| 4,166,580 | 9/1979 | Meckel | 239/542 |
| 4,380,318 | 4/1983 | Curry | 239/542 |

Primary Examiner—Andres Kashnikow
Assistant Examiner—Karen B. Merritt
Attorney, Agent, or Firm—Ladas & Parry

[57] ABSTRACT

An irrigation dripper (10) has a screw threaded shank (12) terminating in a head (14). The shank (12) is tapered and has an axially extending groove or slit (16) are formed on the shank (12) which in use is fitted in a hole formed in a pipe (26). Water from the pipe (26) is discharged through the slit (18) for irrigating plants.

2 Claims, 6 Drawing Figures

IRRIGATION DRIPPER

FIELD OF THE INVENTION

This invention relates to an irrigation dripper.

BACKGROUND OF THE INVENTION

Irrigation drippers having screw threaded shanks with central axial bores are known in U.S. Pat. Nos. 1,520,048 (Baird); 3,335,964 (Singleton); 4,199,105 (Olson et al) and 3,815,831 (Jooste). Some of the drippers described in these patents have arrangements for adjustment of the rate of delivery of water while in others there is no provision for adjustments to the delivery volume. A disadvantage of the known drippers is that the volume of water delivered cannot be varied or in instances where provision is made to vary the delivery volume, the arrangements are elaborate. Further, it is difficult in use to clean the blocked internal passage in the shanks.

OBJECT OF THE INVENTION

It is an object of the invention to provide an irrigation dripper having an axial slit along a shank of the dripper.

SUMMARY OF THE INVENTION

According to the invention an irrigation dripper includes a head fixed to a shank having screw threads and there being an open slit along at least a part of the length of the shank.

Preferably the open slit extends along the entire length of the shank and in one preferred form of the invention the open slit comprises a cutout having side walls which are parallel to each other and a floor which is parallel to the axis of the shank. In another preferred form of the invention the open slit is vee shaped in cross section. In yet another preferred form of the invention the open slit is wedge shaped. The slit may optionally be of uniform depth throughout the length of the shank.

The head preferably has a conical formation of its undersurface, the apex of the cone abutting the end of the shank. Preferably a depending skirt is formed around the base of the conical formation which terminates a short distance away from the periphery of the head of the dripper. Preferably the head comprises a cylindrical hollow body having a knurled outer surface.

The shank is preferably tapered towards it free end and has helical screw threads formed throughout its length. The shank is preferably integrally formed with the head from a mouldable material.

DESCRIPTION OF PREFERRED EMBODIMENTS

Figure 1:
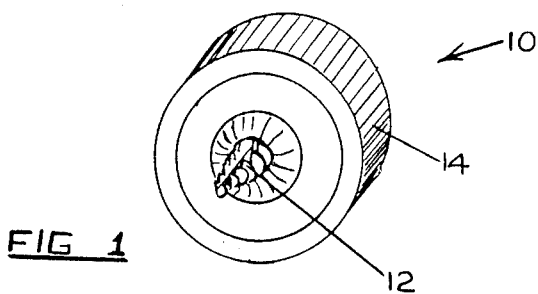
FIG. 1 is a isometric view of a dripper according to one embodiment of the invention.
Figure 2:
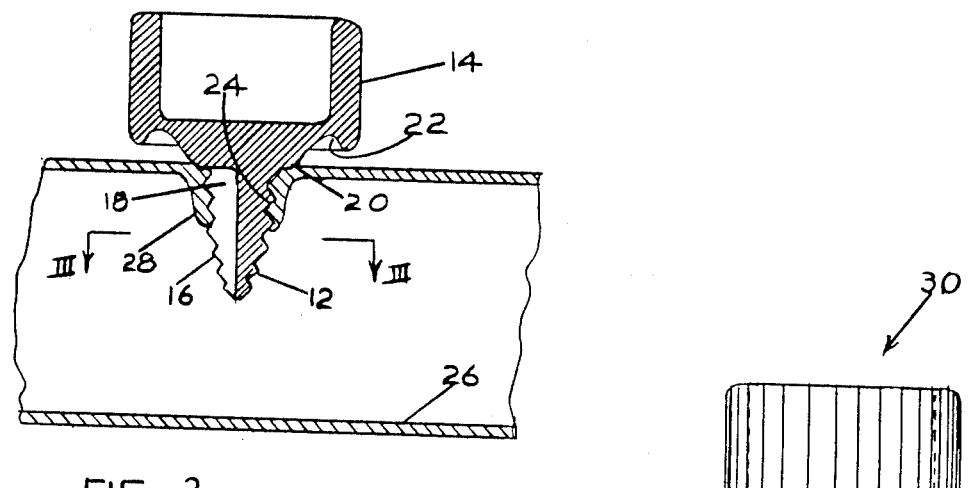
FIG. 2 is a longitudinal section through the dripper of FIG. 1 fitted on a hose.
Figure 3:
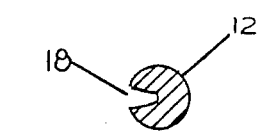
FIG. 3 is a section taken along lines III—III of the dripper of FIG. 1.

Referring to FIGS. 1 to 3 of the drawings an irrigation dripper 10 has a screw threaded shank 12 terminating in a head 14.

The shank 12 is tapered towards the end remote from the head 14 and has helical screw threads 16 formed along its entire length. An axially extending groove or slit 18 of rectangular section and of gradually increasing depth is formed along the entire length of the shank 12. As seen in FIG. 3 the floor of the groove or slit 18 is parallel to the principal axis of the shank 12.

The head 14 comprises a cylindrical body with is hollow and provided on its undersurface with a conical formation 20 having a peripheral outwardly depending lip 22. The conical formation 20 tapers towards the shank 12 while the depending lip 22 extends annularly around the broad end of the conical formation. The outer periphery of the depending lip 22 terminates approximately midway down the length of the conical formation 20. The screw threads 16 terminte a short distance away from the edge of the conical formation 20. The head 14 is knurled at its periphery to provide finger grip.

In use a hole 24 is punched into the wall of a synthetic material hose 26. Punching of the hole 24 causes the material of the hose 26 to be pushed inwardly to constitute a depending peripheral lip 28. The dripper 10 is screwed into the hole 24 to a depth sufficient to give the desired flow rate of water through the groove or slit 18. Water leaving the groove 18 migrates up along the surface of the conical formation 20, down the side of the lip 22 to drip on the hose 26 or directly onto a surface. Water flow through the hole 24 may be shut off completely by screwing the dripper 10 to its extreme downward position so that the conical formation 20 forms a seal with the mouth of the hole 24. Blockages in the dripper 10 may be cleared by increasing the volume of water through the slit 18. This has the effect of flushing out the material causing the blockage.

Figure 4:
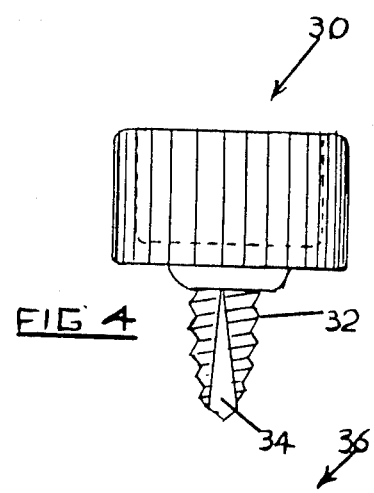
FIG. 4 is a side view of a dripper according to another embodiment of the invention.

Referring to FIG. 4 an irrigation dripper 30 has a shank 32 in which a wedge shaped open slit 34 is formed. The apex of the slit 34 is located remote from the free end of the shank 32. The slit 34 is of uniform depth throughout its length or optionally (not seen in the drawings) the depth may diminish towards the free end of the shank 32.

Figure 5:
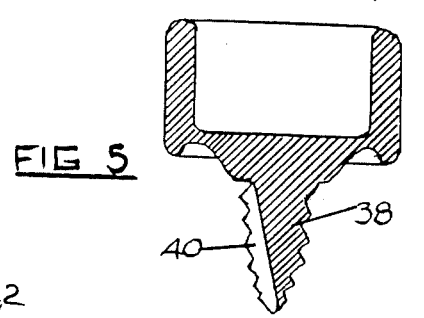
FIG. 5 is a sectional side view of a dripper according to yet a further embodiment of the invention.

In FIG. 5 an irrigation dripper 36 has a shank 38 in which an open slit 40 is formed. As seen in the drawing the depth of the slit 40 is uniform and hence the floor of the slit is parallel to the side surface of the shank 38.

Figure 6:
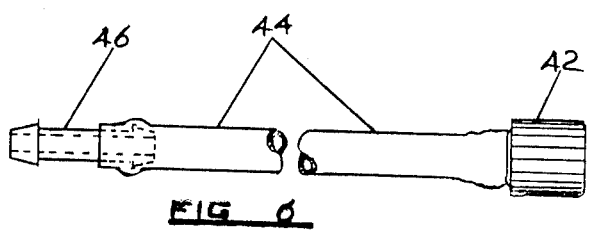
FIG. 6 is a side view of a dripper fitted on a pipe.

An irrigation dripper 42 seen in FIG. 6 is fitted on the end of a short pipe 44. The pipe 44 is in turn fitted on a union 46 for connection with the mainline of a water supply source.

An advantage of the invention is that the drippers are easily serviceable in the event of blockages or the like. The rate of flow of water from the irrigation pipes may be varied from no discharge at all to discharge at a rate proportional to the opening formed in the hose. Additionally the ease with which the drippers may be maintained or replaced has added advantages. Also no special fittings or the like are required to shut off existing drippers or to install new drippers on an irrigation line. The invention is capable of use in irrigation systems having a low pressure water supply.

I claim:

1. An irrigation drippper including a head integrally formed with a shank which is tapered from the end of the shank adjacent the head and towards the free end of the shank, the shank having helical screw threads and an open slit which extends throughout the length of the shank, and the head having a conical formation on its undersurface in which the apex of the cone has a diameter which is no less than the diameter of the end of the shank adjacent the head and merges with the end of the shank at the head, the base of the conical formation being connected to a concentric depending peripheral skirt formed around the undersurface of the head.

2. An irrigation dripper according to claim 1 in which the open slit is vee-shaped in cross-section and the floor of the slit is parallel to the longitudinal axis of the shank.

* * * * *